(12) United States Patent
Louden

(10) Patent No.: US 12,098,610 B2
(45) Date of Patent: Sep. 24, 2024

(54) BORE SEALING METHOD AND APPARATUS

(71) Applicant: ISOL8 (HOLDINGS) LIMITED, Aberdeen (GB)

(72) Inventor: Andrew Louden, Aberdeen (GB)

(73) Assignee: ISOL8 (HOLDINGS) LIMITED, Aberdeen (GB)

( * ) Notice: Subject to any disclaimer, the term of this patent is extended or adjusted under 35 U.S.C. 154(b) by 162 days.

(21) Appl. No.: 17/638,441

(22) PCT Filed: Sep. 2, 2020

(86) PCT No.: PCT/EP2020/025397
§ 371 (c)(1),
(2) Date: Feb. 25, 2022

(87) PCT Pub. No.: WO2021/043444
PCT Pub. Date: Mar. 11, 2021

(65) Prior Publication Data
US 2022/0403711 A1   Dec. 22, 2022

(30) Foreign Application Priority Data

Sep. 2, 2019 (GB) ...................... 1912575

(51) Int. Cl.
*E21B 33/12* (2006.01)
*E21B 33/134* (2006.01)
(Continued)

(52) U.S. Cl.
CPC .......... *E21B 33/1204* (2013.01); *E21B 33/12* (2013.01); *E21B 33/1212* (2013.01);
(Continued)

(58) Field of Classification Search
CPC ............................... E21B 33/1212; E21B 3/13
See application file for complete search history.

(56) References Cited

U.S. PATENT DOCUMENTS 3,134,440 A * 5/1964 Nelson .................. E21B 33/136
166/290
4,515,213 A   5/1985 Rogen et al.
(Continued)

FOREIGN PATENT DOCUMENTS

| WO | 02/099247 A1 | 12/2002 |
| WO | 2015/057338 A1 | 4/2015 |
| WO | 2017/192048 A1 | 11/2017 |

OTHER PUBLICATIONS

International Search Report and Written Opinion for Int. App. No. PCT/EP2020/025397, mailed Oct. 19, 2020.
GB Search Report for App. No. GB1912575.6, dated Oct. 12, 2019.

*Primary Examiner* — Giovanna Wright
(74) *Attorney, Agent, or Firm* — MCDONNELL BOEHNEN HULBERT & BERGHOFF LLP

(57) ABSTRACT

A method of sealing an annulus between first and second bore-lining tubulars comprises providing a first bore-lining tubular having a first volume of alloy thereon and running the first bore-lining tubular into a bore provided with a second bore-lining tubular. The alloy is fluidised and then allowed to solidify in an annulus between the bore-lining tubulars and bond the tubulars together. The alloy may be fluidised in the presence of flux.

18 Claims, 4 Drawing Sheets

(51) Int. Cl.
 *E21B 36/00* (2006.01)
 *C09K 8/42* (2006.01)
(52) U.S. Cl.
 CPC ............ *E21B 33/134* (2013.01); *E21B 36/00* (2013.01); *C09K 8/426* (2013.01)

(56) References Cited

U.S. PATENT DOCUMENTS

| | | | | |
|---|---|---|---|---|
| 6,923,263 | B2* | 8/2005 | Eden | ............... E21B 36/00 166/179 |
| 7,059,410 | B2* | 6/2006 | Bousche | ............... E21B 33/126 166/387 |
| 2002/0121160 | A1* | 9/2002 | Bangert | ............... E21B 19/10 81/57.5 |
| 2006/0144591 | A1* | 7/2006 | Gonzalez | ............... E21B 29/10 166/57 |
| 2015/0101813 | A1 | 4/2015 | Zhao et al. | |
| 2015/0267518 | A1* | 9/2015 | Garcia | ............... E21B 33/1208 166/374 |
| 2018/0313193 | A1 | 11/2018 | Gibb | |
| 2019/0085659 | A1* | 3/2019 | Carragher | ............... E21B 36/00 |
| 2019/0195062 | A1* | 6/2019 | Espe | ............... E21B 36/00 |

* cited by examiner

BORE SEALING METHOD AND APPARATUS

CROSS REFERENCE TO RELATED APPLICATIONS

The present application is a U.S. National Phase Application pursuant to 35 U.S.C. § 371 of International Application No. PCT/EP2020/025397 filed Sep. 2, 2020, which claims priority to GB Patent Application No. 1912575.6 filed Sep. 2, 2019. The entire disclosure contents of these applications are herewith incorporated by reference into the present application.

FIELD

This disclosure relates to a method and apparatus for use in sealing bores, such as well bores created to access subsurface hydrocarbon-bearing formations.

BACKGROUND

The bores drilled from surface to access underground hydrocarbon-bearing rock formations are conventionally lined with multiple concentric casing strings. The first section of the bore is drilled to a relatively large diameter before being lined with a relatively short first casing string, sometimes referred to as a conductor pipe. A subsequent bore section is drilled beyond the end of the conductor, before being lined with a longer but smaller diameter casing string which extends upwards from the distal end of the bore, through the newly drilled section of the bore, and to the upper end of the conductor. This process is repeated until a casing-lined bore of the appropriate depth has been created. The casing strings are typically sealed against the bore wall and adjacent casings using cement; once a casing string has been run into the bore, the annulus between the casing and the bore wall and the lower portion of the annulus between the casing and the next-larger casing are filled with cement slurry which sets to form a seal.

It is well established that the integrity of the cement may be compromised over time due to one or more of de-bonding between the cement and the casing, formation of micro-annuli, chemical degradation, creep and shrinkage. Any of these processes may result in the loss of sealing between the casing and the surrounding rock, which may result in leakage of fluids from higher pressure formations entering the casing annuli. During the drilling and production phases the well bore is closely monitored, and any leaks will be quickly identified, and the necessary corrective action undertaken. This typically involves bleeding off surface pressure to ensure the annulus does not exceed the maximum annulus shut-in pressure. However, during the well abandonment phase it can be technically and operationally complex and expensive to create an effective seal in the leaking annulus. After the well is abandoned there may be no monitoring in place and, following the removal of the surface infrastructure, any corrective action would be difficult and expensive, particularly for offshore wells.

In light of these concerns, guidelines and protocols have been established to seek to ensure that abandoned wells are safely sealed or "plugged". Typically, these guidelines require multiple cement plugs to be placed in the bore at various locations. The location, form and extent of the cement plugs may depend on whether the operator has been able to establish the integrity of the cement sheaths between the various casing strings and the surrounding rock. However, establishing the integrity of the cement bond between casing and rock at the time of well abandonment is not straightforward due to the presence of multiple concentric strings, which affects the ability of acoustic-based logging tools to provide a conclusive determination. Accordingly, in many instances extensive cement plugs will be required. Where the integrity of the cement seal cannot be established, sections of casing and cement may be removed to expose the bore wall. This allows emplacement of a new cement seal in direct engagement with the rock of the bore wall. However, removal of the casing, for example by cutting and retrieving casing, or by milling, requires provision of extensive surface infrastructure and generates large volumes of waste which must be shipped and safely disposed of. Further, as noted above, cement degrades over time and there are concerns that the provision of an effective cement seal may be time limited.

SUMMARY

According to an aspect of the disclosure there is provided a method of sealing an annulus between first and second bore-lining tubulars, the method comprising:
  providing a first bore-lining tubular having a first volume of alloy thereon;
  running the first bore-lining tubular into a bore provided with a second bore-lining tubular;
  fluidising the alloy; and
  allowing the alloy to solidify in an annulus between the first bore-lining tubular and the second bore-lining tubular and bond the first-bore lining tubular to the second bore-lining tubular.

The alloy may be fluidised in the presence of flux.

The method may comprise centralising the first bore-lining tubing in the second bore-lining tubing with the first volume of alloy, that is the volume of alloy acts as a tubing centraliser.

The alloy may create a seal between the first bore-lining tubular and the second bore-lining tubular.

At least one of the bore-lining tubulars may be casing or liner. The tubulars may be formed of any suitable material, such as a steel.

The alloy may solidify above one of a packer and a liner hanger and may supplement an existing packer or liner hanger. Alternatively, the alloy may serve as a packer or liner hanger.

A retainer may be provided for retaining fluidised alloy. The method may comprise radially extending a retainer from the first bore-lining tubular and retaining the fluidised alloy above the retainer. The retainer may be initially provided in a retracted configuration or position. The retainer may be retained in the retracted configuration by a fusible member. For example, the fusible member may encircle or otherwise restrain the retainer. Alternatively, the fusible member may be operatively associated with a restraining member, such as a sleeve, and heating of the fusible member may permit movement or reconfiguration of the restraining member. The retainer may thus remain in the retracted configuration until the fusible member is heated to fluidise or otherwise weaken the member and allow the retainer to radially extend.

The method may further comprise:
  providing the second bore-lining tubular with a second volume of alloy thereon;
  running the first bore-lining tubular into the second bore-lining tubular and locating the first volume of alloy adjacent the second volume of alloy; and
  heating the first volume of alloy and allowing the first volume of alloy to heat the second volume of alloy.

Another aspect of the disclosure provides downhole apparatus comprising a first bore-lining tubular for location within a second bore-lining tubular, the first bore-lining tubular having a volume of fusible alloy on an outer portion thereof, the alloy being provided in combination with a volume of flux for facilitating downhole bonding between the alloy and a surrounding second bore-lining tubing.

The disclosure also relates to downhole apparatus comprising a volume of fusible alloy in combination with volume of flux, the alloy adapted for mounting on a first bore-lining tubular for location within a second bore-lining tubular, whereby the flux facilitates downhole bonding between the alloy and the bore-lining tubulars.

The volume of alloy may comprise a collar or sleeve.

The composition of the alloy may be selected to provide, for example, desired melt ranges or physical properties, and more than one alloy composition may be provided at different portions of the alloy. For example, the composition of the alloy may vary axially along the tubular. The alloy may include low melt point bismuth/tin alloys, or may include tin-based alloys, such a Babbitt alloys. In some examples a high tin alloy may be utilised, the alloy comprising copper (2.5-8.5%), antimony (4-16%) and nickel (<1%), or other metal additives.

The apparatus may include an alloy retainer for maintaining fluidised alloy at a bonding location while the alloy solidifies.

According to another example of the disclosure there is provided a method of sealing concentric casing annuli, the method comprising:
locating a first bore-lining tubular within a bore, the first bore-lining tubular carrying a first sealing material at a first sealing location on an outer surface thereof, and
locating a second bore-lining tubular within the bore, the second bore-lining tubular carrying a second sealing material at a second sealing location on an outer surface thereof, the second bore-lining tubular being located in the bore such that the second sealing location is adjacent the first sealing location.

According to a second example of the disclosure there is provided concentric casing annuli sealing apparatus comprising:
a first bore-lining tubular having a first sealing material on an outer surface thereof; and
a second bore-lining tubular having a second sealing material on an outer surface thereof, the second bore-lining tubular configured for location within the first bore-lining tubular with the second sealing material located internally of the first sealing material.

A settable sealing material, such as cement, may be provided externally of the first bore-lining tubular or externally of the second bore-lining tubular.

At least one of the sealing materials may be activated or triggered once the bore-lining tubulars are positioned in the bore. For example, the second sealing material may be activated to fluidise and flow to seal the annulus between the second bore-lining tubing and the first bore-lining tubing or, if the second sealing material is located in a part of the annulus which has been cemented, to occupy any gaps or cracks in the cement between the second bore-lining tubing and the first bore-lining tubing. The first sealing material may be activated to fluidise and flow to seal the annulus between the first bore-lining tubular and a bore wall or, if the annulus has been cemented, to occupy any gaps or cracks in the cement between the first bore-lining tubular and the bore wall. At least one of the sealing materials may be activated or triggered at the time of well construction or on plugging of the bore, for example at abandonment of an oil or gas well. The activated sealing material may flow and fill any gaps or cracks which have developed over the life of the well.

At least one of the sealing materials may be activated or triggered by application of heat, for example the sealing materials may comprise alloys or other materials that may be mobilised by application of heat. A heater may be located within the second bore-lining tubular. The second sealing material may facilitate transfer of heat to the first sealing material. The heater may take any appropriate form and may be, for example, electric, inductive, or exothermic.

The composition of at least one of the sealing materials may be selected to provide improved thermal conductivity. For example, a low melt point alloy such as a bismuth alloy may be combined with a higher melt point material, such as copper. Where copper constitutes more than 50% of the volume of such a sealing material the mixture may have a thermal conductivity of 100 W/mK or more, as opposed to 10-20 W/mK for bismuth and its alloys. This significantly increases the heat transfer rate through the sealing material, facilitating heating of materials which may be radially spaced from a heater located within the innermost tubular.

Alternatively, or in addition, at least one of the sealing materials may incorporate forms or structures to enhance heat transfer, for example radial fins or other structures of thermally conductive material such as aluminium or copper may be provided in combination with the sealing material.

The composition of at least one of the sealing materials may be selected to affect the flow characteristics of the molten or fluidised material. The sealing material may comprise a composite alloy mixture of a higher melt point filler mixed with a low melt point alloy, for example granular copper filler may be mixed with a tin-based alloy. The copper filler provides a bridging material that fills small voids and prevents the liquid alloy from draining away below the target region.

The sealing materials may be located in the bore adjacent to impermeable rocks such as cap rocks.

In other examples, the sealing material on the bore-lining tubular may be positioned at different depths. The sealing material may be positioned in a bore above or in replacement of other seal arrangements, such as liner hangers, production packers and other items. The sealing material may be activated at the time of well construction or at the time of well abandonment or if a sealing medium of the sealing arrangement, for example an elastomeric element, fails during the life of the well.

At least one of the sealing materials may be provided in combination with a flux material. The flux material may be intermixed with the sealing material or may be provided in cavities of chambers within the sealing material. A flux material may be selected to improve bond formation between the sealing material and the outer bore-lining tubular. The flux material may be provided in any suitable form and at any suitable location. For example, the flux material may be intermixed with the sealing material and may flow with the sealing material when the sealing material is fluidised. The flux material may be selected from organic or inorganic acid flux compounds commonly used in solder or low melt temperature alloy joining processes. These fluxes serve to deoxidize the surfaces and enhance the wettability of the metals being joined.

At least one of the sealing materials may be provided in the form of a centraliser, facilitating location of the associated bore-lining tubular within a bore or within a larger tubular.

Sealing material may be applied or mounted to the associated bore-lining tubular by any appropriate means, for example an alloy sealing material may be applied to the tubular by wet dipping, electroplating, wave soldering, or casting.

The sealing material may be provided in the form of a pre-formed sleeve or other generally annular form for location on the bore-lining tubular. The annular form may be provided as a single part or may be provided in multiple parts, for example as two halves which may be assembled around the tubular. The sleeve may be secured on the tubular by any suitable arrangement, for example using one or more stop collars, or by bonding the sleeve to the tubular.

The sealing material may have a profiled outer surface to, for example, facilitate or enhance a cementing process. In one example the outer surface of the sealing material is grooved or fluted, or the outer surface may be formed to facilitate keying the set cement to the sealing material or facilitate flow or displacement of fluid past the sealing material while the bore-lining tubular is being run into the bore or as the bore-lining tubular is being cemented in the bore.

The sealing material may be provided in combination with a sealing material retainer, for maintaining fluidised or molten sealing material at a sealing location while the sealing material solidifies or freezes. The sealing material may comprise an alloy that may be melted to flow and occupy a volume and then freeze to create a solid barrier or seal. In the absence of a retainer such a material may flow away from the sealing location. The retainer may include one or more members or forms that swell, extend or expand to create a flow restriction, barrier, or dam, for example an expanding cup or petal seal. The retainer may be initially maintained in a retracted configuration and may subsequently assume an extended configuration. The retainer may be maintained in a retracted configuration by a fusible member, for example a band of low melt material. The sealing material retainer may comprise a member which remains relatively cool while the sealing material is mobilised by heating, for example the member may comprise a material having a relatively low thermal conductivity. Thus, when the fluidised sealing material contacts the lower temperature retainer member the sealing material will tend to freeze, creating a dam or barrier to following sealing material, and limiting or restricting flow of the sealing material beyond the member. Alternatively, or in addition, the sealing material retainer may comprise a swellable material. The swelling material may swell on heating, or on exposure to well fluids. In another example two components may be separated by a fusible material and on melting of the material the two components react and swell.

According to another aspect of the disclosure there is provided a downhole method comprising:
locating a first bore-lining tubular within a bore, the first bore-lining tubular carrying a heat-activated material on an outer surface thereof; and
locating a second bore-lining tubular within the bore, the second bore-lining tubular carrying a heat transfer medium on an outer surface thereof, the second bore-lining tubular being located in the bore such that the heat transfer medium is located adjacent the heat-activated material.

According to a further aspect of the disclosure there is provided downhole apparatus comprising:
a first bore-lining tubular having a heat-activated material on an outer surface thereof; and
a second bore-lining tubular having a heat transfer medium on an outer surface thereof, the second bore-lining tubular configured for location within the first bore-lining tubular with the heat transfer medium located internally of the heat-activated material.

The presence of the heat transfer medium facilitates transfer of heat to the heat-activated material from a heater located in the second bore-lining tubular.

The heat transfer medium may comprise a volume of metal, such as a volume of alloy. The heat transfer medium may comprise a sealing material as described herein.

The heat-activated material may comprise a sealing material as described herein.

The sealing material of the various aspects of the disclosure may be located at any appropriate location in a bore, for example aligned with a cap rock or other impervious rock formation.

An example of the disclosure provides downhole apparatus comprising a collar of alloy including a high thermal conductivity material and adapted for mounting on a first bore-lining tubular for location within a second bore-lining tubular, whereby the high thermal conductivity material facilitates heat transfer from the first bore-lining tubing to the second bore-lining tubing.

The alloy may be fusible.

The high thermal conductivity material improves the heat transfer characteristics of the alloy and may be provided in any appropriate proportion. The material may be copper.

Another example of the disclosure relates to a downhole method comprising:
providing a collar of alloy including a high thermal conductivity material on a first bore-lining tubular;
locating the first bore-lining tubular within a second bore-lining tubular, and
transferring heat from the first bore-lining tubing to the second bore-lining tubing via the collar.

The method may comprise fluidising the alloy

According to a still further aspect of the disclosure there is provided a downhole sealing method comprising:
locating an alloy sleeve or collar on a tubing section;
incorporating the tubing section in a tubing string;
running the tubing string into a bore;
fluidising the alloy sleeve or collar; and
permitting the fluidised alloy sleeve or collar to reform and create a barrier between the tubing string and a surrounding bore wall.

According to a yet further aspect of the disclosure there is provided a sealing arrangement for downhole tubing, the sealing arrangement comprising an alloy sleeve or collar for location on a downhole tubing, the sleeve or collar being adapted to be fluidised downhole and to reform and create a flow barrier externally of the tubing.

The sealing arrangement may be provided for location on an otherwise conventional section of tubing, for example a casing or liner section. Alternatively, the sealing arrangement may be provided already mounted on a tubing section, such as a pup joint, to be incorporated in a tubing string.

The various aspects of the disclosure may be combined. The various features described in combination with selected examples of the disclosure, and as recited in the appended dependent claims, may be combined with other examples of the disclosure and may also have utility independently of the examples of the disclosure.

BRIEF DESCRIPTION OF THE DRAWINGS

Examples of the disclosure will now be described with reference to the accompanying drawings, in which.

DETAILED DESCRIPTION

Figure 1:
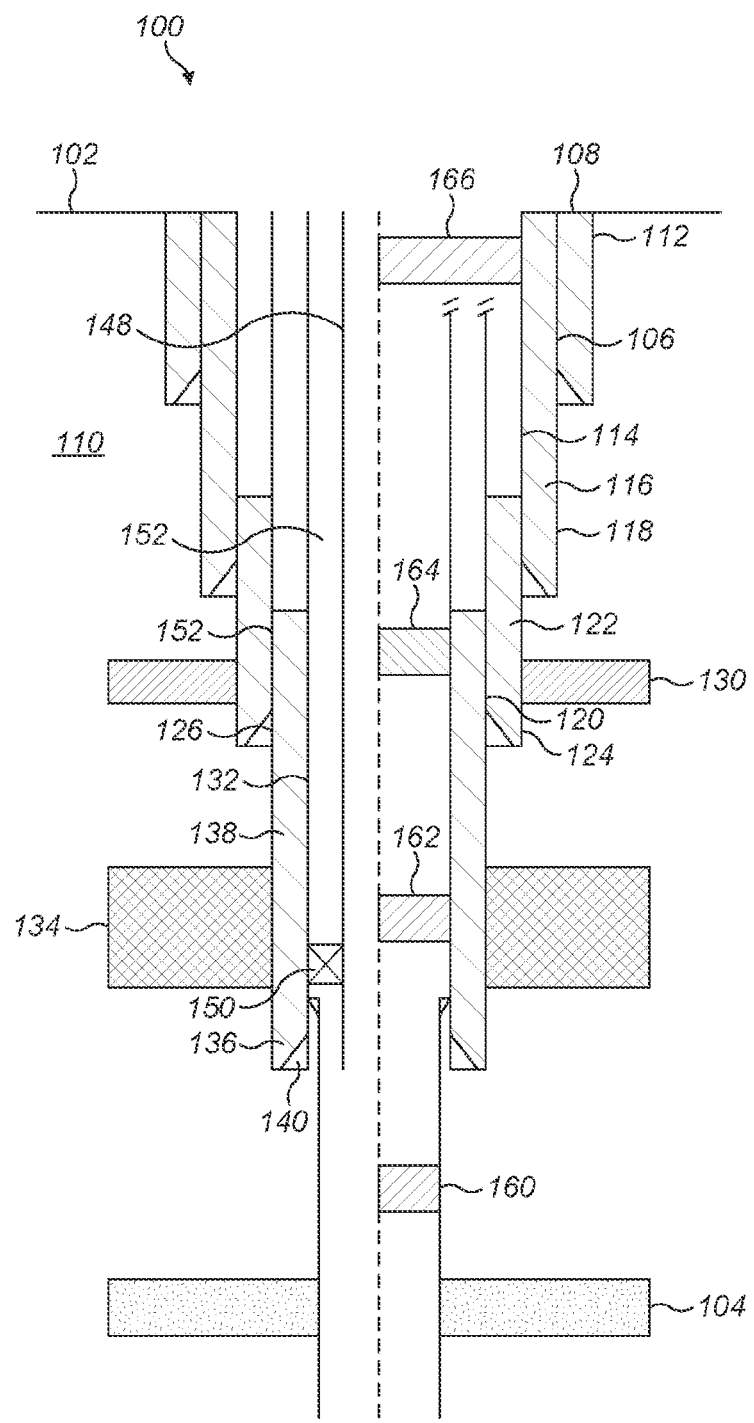
FIG. 1 is an illustration of a conventional well construction and a conventional well abandonment.

Reference is first made to FIG. 1 in which the left side of the drawing illustrates an example of a conventional well construction and the right side of the drawing illustrates some examples of conventional well abandonment methodologies.

The well 100 is an offshore well and thus extends downwards from the seabed 102, sometimes referred to as the mudline, to a hydrocarbon reservoir 104. The well 100 is lined by various tubing strings, as described below. A larger diameter steel tubing string in the form of a conductor pipe 106 extends from the mudline 102 and an annulus 108 between the conductor 106 and the surrounding rock 110 has been filled and sealed with cement 112. A tubing string in the form of casing 114 (referred to as the C-casing) is located within the conductor 106 and extends from the mudline 102 further into the well 100. The annulus 116 between the C-casing 114 and the conductor 106 and the bore wall has also been filled and sealed with cement 118.

The next smaller bore-lining tubing is also casing 120 (referred to as the B-casing) and extends from the mudline 102 still further into the well 100. The annulus 122 between the B-casing 120 and the bore wall and the next-larger C-casing 114 is partially filled and sealed with cement 124. It will be noted from FIG. 1 that the cement 124 does not fill the entire annulus 122, but the cement 124 extends upwards from a shoe 126 at the lower end of the B-casing 120 to a level above a shoe 128 on the lower end of the C-casing 114. In the illustrated example the B-casing 120 extends through an intermediate formation or zone 130, which may be a minor hydrocarbon-bearing formation, but not the major formation 104 from which oil or gas is to be extracted. The cement 124 seals and isolates the intermediate formation 130.

The next smaller bore-lining tubing is again casing 132 (referred to as the A-casing) and extends from the mudline 102 through a cap rock 134, a relatively impermeable rock that forms a barrier or seal above the reservoir rock 104, and into the reservoir 104. The annulus 136 between the A-casing and the bore wall and the B-casing 120 is partially filled and sealed with cement 138, with the cement 138 extending from a shoe 140 on the lower end of the A-casing 132 to above the B-casing shoe 126.

The distal or far end of the well 100 is lined with tubing in the form of liner 142 which is suspended from a liner hanger 144 provided towards the distal end of the A-casing 132. The annulus 146 surrounding the liner 142 may be filled with cement or may be left unfilled and unsealed.

The illustrated well 100 is also provided with production tubing 148 which may be used to carry oil or gas from the reservoir 104 to the surface. A production packer 150 is provided between the distal end of the production tubing 148 and the A-casing 132, above the proximal end of the liner 142 and level with the cap rock 134. The annulus 152 surrounding the production tubing 148 is left unfilled and, like the other unfilled annuli, will be occupied by well fluid.

Reference is now also made to the right side of FIG. 1, which illustrates the well 100 post-abandonment. As will be described, the operator has taken various actions to seal the well 100 to ensure that there is no leakage of oil or gas from the abandoned well 100, and to ensure that fluid from one formation does not flow into and contaminate another formation.

If the liner 142 has been cemented, a lower cement plug 160 may be provided in the liner 142, above the reservoir 104. Alternatively, or in addition, a further cement plug 162 may be provided where the well passes through the cap rock 134. However, before emplacing such a plug 162 the operator removes the production tubing 148 and the production packer 150. The operator may further mill out or otherwise remove a portion of the A-casing 132 and the surrounding cement 138 such that the cement plug 162 may engage and seal directly with the cap rock 134 (not illustrated).

A further cement plug 164 may be provided above the intermediate formation 130. Again, an operator may choose to remove a section of the A-casing 132 and B-casing 120 and the surrounding cement 138, 124 such that the plug 164 engages directly with the surrounding rock (not illustrated).

The operator has also removed the upper ends of the A and B-casings 132, 120 below the mud line 102 and emplaced a larger cement plug 166.

It will be appreciated by the skilled person that cutting, milling and removing sections of steel tubing, cement and packers requires provision of capital-intensive equipment and tools, substantial surface infrastructure in the form of rigs or large vessels, is time-consuming, and thus hugely expensive. The operations also generate large volumes of difficult-to-handle waste material which must be stored temporarily on the rig before being transported to shore for proper disposal.

It will also be appreciated that the above description is provided merely as background and is not intended to indicate any restriction or limitation in the application or utility of the methods and apparatus of the present disclosure.

Figure 2:
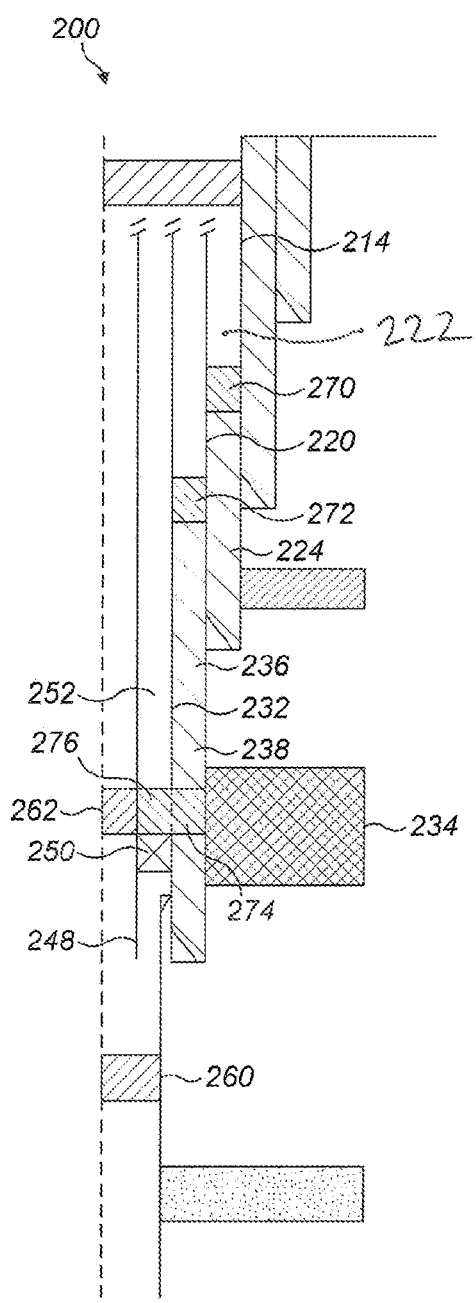
FIG. 2 is an illustration of a well abandonment in accordance with an aspect of the present disclosure.

Reference is now also made to FIG. 2 of the drawings, an illustration of a well abandonment in accordance with an aspect of the present disclosure. By way of example, the illustration refers to the abandonment of the well 200 sharing many of the features of the well 100 described above. However, the bore-lining tubing utilised in the well 200 differs from the tubing utilised in the well 100, as will be described.

In the well 200, the B-casing 220 is provided with a band of seal-forming material 270 on an exterior surface. The sealing band 270 is located on the B-casing 220 such that, when the B-casing 220 is cemented in the bore, the sealing band 270 is located adjacent the upper end of the cement 224 provided externally of the B-casing 220.

At any appropriate time, as selected by the operator, the sealing band 270 may be heated to fluidise the material forming the seal 270. This may be achieved by locating a heater inside the B-casing 220 and heating the sealing band 270 via the casing 220. The heater may take any appropriate form, and may be an exothermic heater, such as a thermite heater. The fluidised material then flows and fills the B-casing annulus 222 between the B-casing 220 and the C-casing 214. If the band 270 is located within the portion of the annulus 222 that has been cemented the fluidised material will flow and occupy any micro-annuli between the B-casing 220 and the cement 224 or between the cement 224 and the surrounding C-casing 214. The fluidised material also flows into cracks or defects in the cement 224. A volume of seal-forming material may be provided such, once the material has cooled and solidified, an annular plug of material remains to sit on the upper end of the cement 224.

The band 270 of this example may be formed from a composite alloy mixture of high thermal conductivity granular metal filler mixed with a tin alloy (which may melt between 70-450° C.). The high thermal conductivity filler provides bridging material to fill small voids and prevent the liquid alloy from draining away below the target region. Some molten tin alloys have the viscosity of water and with a high density develops a hydraulic head that pushes the molten alloy through the smallest leaks. Some high thermal conductivity granular metal fillers, such as copper, with melt temperatures of >1000° C., wet very well with the tin alloy and are denser than the alloy and so will not float on the molten alloy. High thermal conductivity metals also have an extremely high thermal conductivity (>400 W/mK vs 10-20 W/mK for bismuth and its alloys). The filler constitutes over half the volume of the mixture, and significantly raises the thermal conductivity of the mixture to over 100 W/mK. This will increase by a factor of more than four the radial heat transfer rate through the annular volume of material. This enhanced thermal conductivity facilitates melting of the full thickness of the band 270 and facilitates transfer of heat to the C-casing 214, improving the distribution of the molten alloy and the bonding between the alloy and the C-casing 214.

The other bands of seal-forming material may be formed of similar material.

To improve the bonding achieved between the seal-forming alloy and the steel casings, a flux material is incorporated in the composite alloy mixture. The flux material may be selected from organic or inorganic acid flux compounds commonly used in solder or low melt temperature alloy joining processes. These fluxes serve to deoxidize the surfaces, protect the surfaces from re-oxidisation, and enhance the wettability of the metals being joined. In the absence of such flux the it is likely that a "dry" bond will be created between the solidified alloy and the surfaces of the steel casings, increasing the likelihood of micro-annuli between the surfaces of the alloy and the steel. These micro-annuli may provide a leak path and allow passage of fluid up the annulus. In the event of a high-pressure differential across the target region, the alloy will soon erode, wash-out and fail.

A similar band of seal-forming material 272 is provided on the exterior of the A-casing 232 and may be heated to fluidise in a similar manner to cap and seal the cement 238 in the annulus 236 surrounding the A-casing 232. The positioning of 272 may be adjacent to the sealing band 270 to create a sealing envelope. The seal-forming material 272 may be fluidised immediately following cementing of the A-casing 232 or may fluidised subsequently.

A further band of seal-forming material 274 is provided on the A-casing 232 at the location where the A-casing 232 passes through the cap rock 234. The seal-forming material 274 may be fluidised immediately following cementing of the A-casing, or may be fluidised later, as described below.

The lower band of seal-forming material 274 on the A-casing 232 provides for sealing of the annuli 236, 252 internal to the cap rock 234 in combination with a band of seal-forming material 276 provided on the production tubing 248, at the location where the production tubing 248 passes through the cap rock 234, and above the production packer 250.

It will be noted that in the example of FIG. 2 the production tubing 248 remains in the well 200 on abandonment. The seal-forming material from the band 276 may be fluidised and subsequently allowed to solidify to create a sealing cap around and above the production packer 250. Thus, if any elastomeric sealing materials in the packer 250 degrade or fail, the sealing material 276 will maintain the integrity of the seal in the annulus 252.

The band of sealing material 276 on the production tubing 248 may be activated at any appropriate point. Further, the sealing material 276 may be reactivated if desired, for example to flow into and close any annuli, cracks or defects that may have developed over the life of the well 200, or in response to a leak in the packer 250.

The high thermal conductivity of the alloy mixture 276 will result in heat being transferred from a heater located within the production tubing 248, through the material 276, to the outer volume of alloy 274, thus activating or reactivating both volumes of material 274, 276. Likewise, the positioning of 276 adjacent to sealing bands 272 and 270 (not illustrated) could create a pressure sealing envelope at a single wellbore depth location.

Production tubing and liner barrier plugs 262, 260 may be deployed on wireline and a near-surface cement plug 266 may be set after removing the upper ends of the A and C casings 232, 220 below the mudline 202.

Figure 3:
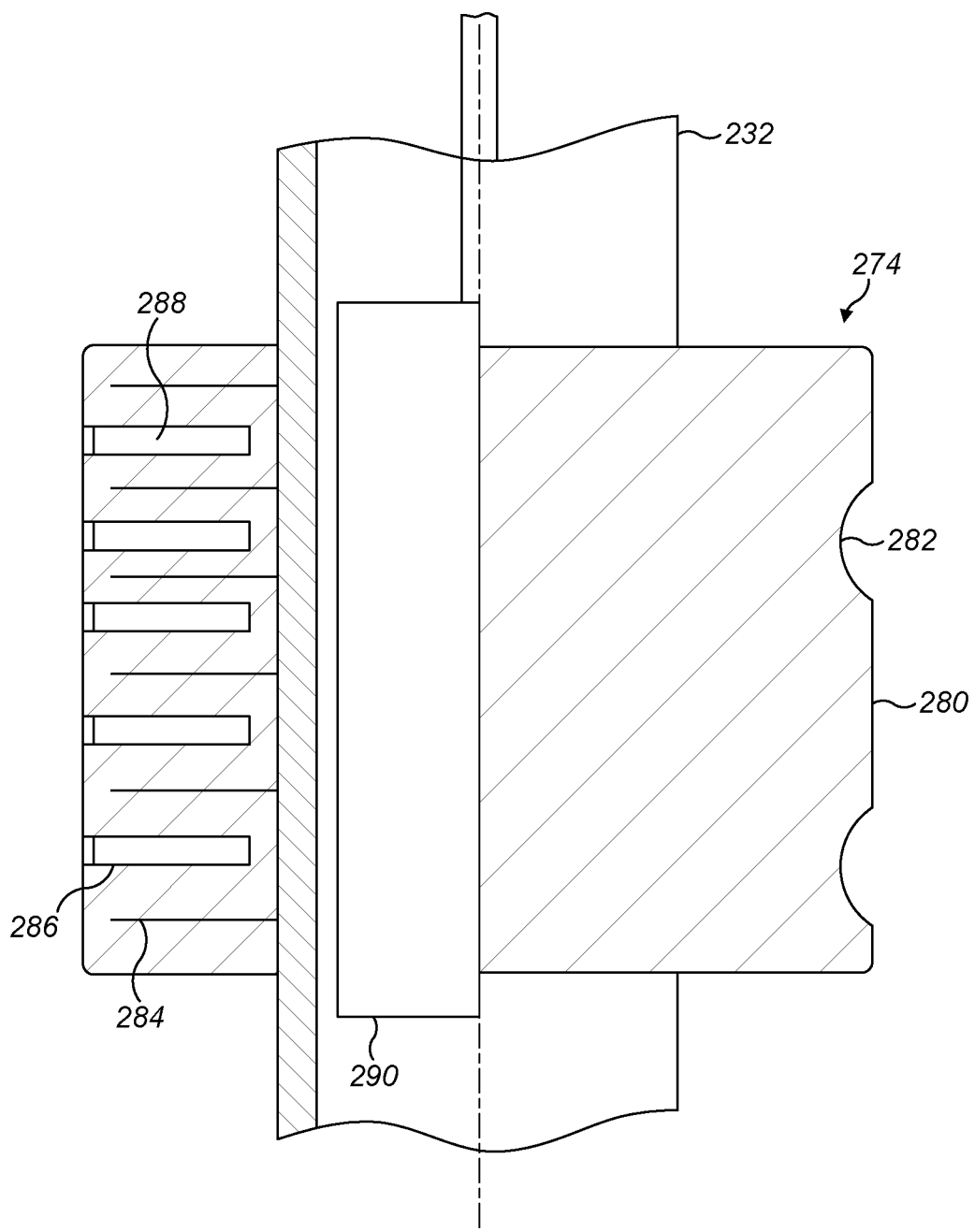
FIG. 3 is a part-sectional enlarged view of a seal-forming band in accordance with an aspect of the disclosure.

Reference is now also made to FIG. 3 of the drawings, an enlarged part-sectional view of view of a seal-forming band 274. The other sealing bands may have a similar structure. The band 274 has the form of a solid body centraliser, and has an outer surface formed with spiral blades 280 and flutes 282 to locate the A-casing 232 centrally within the drilled bore and to permit fluid to pass over the band 274 as the A-casing 232 is being cemented in the bore.

The material forming the band 274 has been cast around the casing 232 and over aluminium or copper radial fins 284 which boost the radial heat transfer through the fusible alloy material. The band 274 also features radial bores 286 which are filled with flux 288 and capped. The configuration of the fins and radial bores are illustrative and different configurations are anticipated.

FIG. 3 also shows a wireline-deployed heater 290 located within the casing 232, for fluidising the material 274. The band 274 may include a radio-active pip tag to aid depth correlation between the heater 290 and the band 274. Alternatively, or in addition, the location of the alloy band 270 may be detected using other wireline-mounted detection methods or devices, such as ultrasonic or density detection or alternatively the alloy band 270 may be placed adjacent to an internal profile in the casing or tubing which may be detected by a wireline tool.

Figure 4:
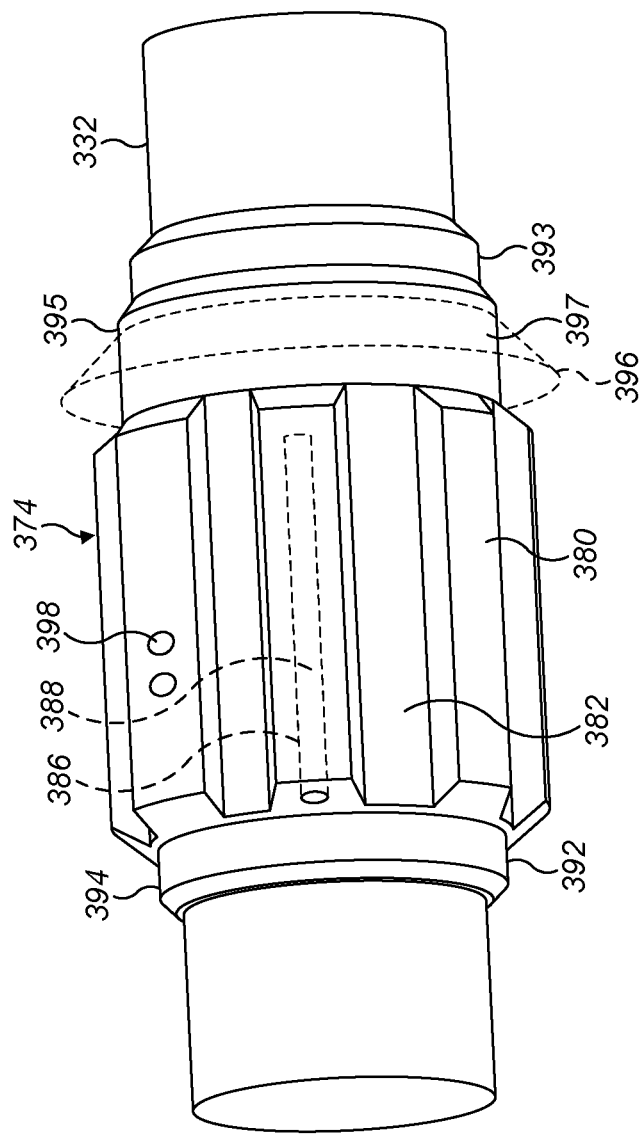
FIG. 4 is perspective view of a sealing arrangement for downhole tubing in accordance with an aspect of the disclosure.

Reference is now also made to FIG. 4 of the drawings, a perspective view of a sealing arrangement for downhole tubing in accordance with another aspect of the disclosure. The sealing arrangement comprises an alloy sleeve 374 of generally similar form to a solid body centraliser. The sleeve 374 has an outer surface formed with axially extending blades 380 and flutes 382. The blades 380 include capped axial bores 386 which have been filled with flux 388.

The sleeve is 374 illustrated on a tubing section, for example a section of A-casing 332, and will serve to locate the casing 332 centrally within the drilled bore and to permit well fluid and cement slurry to pass over the sleeve 374 as the A-casing 332 is run into a bore and subsequently cemented in the bore.

The sleeve 374 may be located on the casing 332 before mobilisation to the wellsite. The sleeve 374 is retained at a desired location on the casing 332 by upper and lower stop collars 392, 393 which may be secured on the casing 332 using grub screws 394. The stop collars 392, 393 may be formed of a similar material to the casing 332, for example a steel.

A molten alloy retainer 395 is provided between the sleeve 374 and the lower stop collar 393. The retainer 395 includes a cup seal 396 which is initially retained in a retracted configuration by a band or sleeve 397 of fusible material, such as an alloy or silicone. The band 397 substantially retains its structural integrity at ambient well temperature. The cup seal 396 may be of any suitable form, for example an arrangement of metal petals, and may incorporate a silicone element or disc. On heating of the sleeve 374 to fluidise the alloy of the sleeve 374, the band 397 melts or degrades and the seal 396 extends to contact the surrounding bore wall. Any molten alloy flowing down the annulus is thus retained above the seal 396.

At least a lower portion of the retainer 395 may be formed of a material having a low thermal conductivity, for example a composite, such that this portion of the retainer 395 remains relatively cool as a heater located within the casing 332 is utilised to melt the sleeve 374. Thus, if molten alloy moves down the annulus and contacts the cooler lower portion, the alloy is likely to freeze and create a dam to contain the remaining molten alloy.

In an alternative arrangement the sleeve 374 may be secured on the casing 332 by means other than or in addition to stop collars. For example, a bonding material may be injected or otherwise emplaced between the sleeve 374 and the casing 332. The bonding material may be a low melt point alloy. In one example a sleeve 374 is located on a pup joint and molten bismuth/tin (Bi/Sn) alloy poured into a radial port 398 in the sleeve 374 to flow through and at least partially fill the annular gap between the inner diameter of the sleeve 374 and the outer diameter of the casing 332. The molten alloy would then freeze in the gap and bond the sleeve 374 to the casing 332. The molten alloy could be retained in the gap by cooling the ends of the sleeve 374 or by providing sealing members between the ends of the sleeve 374 and the casing 332. For example, the sleeve 374 may feature internal grooves accommodating PTFE seals.

In the above example the retainer 395 includes a cup seal 396 which is initially retained in a retracted configuration by a band or sleeve 397 of fusible material. In other examples the sleeve 397 may retain its structural integrity on heating but may be biased to retract or translate when a fusible retainer or other component softens or melts, allowing the seal 396 to extend. For example, a spring-biased steel sleeve 397 may be axially retained on the sleeve 374 by one or more alloy or aluminium shear pins. Initially, the sleeve 397 extends over and restrains the seal 396 in the retracted configuration. On heating, the pins soften and shear to permit the sleeve 397 to translate axially and allow the seal 396 to extend.

The above description describes use of alloys as suitable sealing materials. In certain examples these may include low melt point bismuth/tin alloys. However, certain aspects of the disclosure relate to the use of tin-based alloys, such a Babbitt alloys. In some examples a high tin alloy may be utilised, the alloy comprising copper (2.5-8.5%), antimony (4-16%) and nickel (<1%), or other metal additives to achieve desired melt ranges and physical properties. These tin-based alloys may have higher melt point and may also have better physical properties than Bi/Sn alloys, such as higher creep resistance.

Certain low melt point alloys, such as alloys with a high bismuth content (for example >55% bismuth) expand on freezing, and these alloys may be utilised. However, the non-expanding alloys, such as Babbitt alloys, may provide better physical properties, and when used in combination with an appropriate flux may provide a particularly secure bond with the bore-lining tubulars.

A sealing sleeve or collar may be formed from a single alloy composition. However, if desired the alloy composition may vary across the sleeve or collar. For example, an alloy collar may feature bands or portions having compositions selected to provide selected properties, such as a lower portion of higher density with enhanced corrosion resistance, a high strength middle portion, and a more compliant upper portion.

The invention claimed is:

1. A method of sealing a well bore nnulus between first and second well bore-lining tubulars, the method comprising:
providing a first well bore-lining tubular having a first volume of alloy, a retainer, and a fusible member thereon, the retainer having a retracted first configuration and a radially extended second configuration, the retainer being initially maintained in the retracted first configuration by the fusible member, and the fusible member being configured to retain structural integrity and maintain the retainer in the retracted first configuration at ambient well temperature;
running the first well bore-lining tubular into a well bore provided with a second well bore-lining tubular;
utilizing the fusible member to maintain the retainer in the retracted first configuration in the well bore;
activating a heater to heat the fusible member to above ambient well temperature whereby the fusible member loses structural integrity and the retainer assumes the radially extended second configuration and radially extends from the first well bore-lining tubular;
fluidising the alloy;
retaining the fluidised alloy above the extended retainer; and
allowing the alloy to solidify in an annulus between the first well bore-lining tubular and the second well bore-lining tubular and bond the first well-bore lining tubular to the second well bore-lining tubular.

2. The method of claim 1, wherein the heater is an exothermic heater.

3. The method of claim 1, wherein flux is incorporated with the alloy and the alloy is fluidised in the presence of flux.

4. The method of claim 1, comprising centralising the first bore-lining tubing in the second bore-lining tubing with the first volume of alloy.

5. The method of claim 1, wherein the alloy creates a seal between the first bore-lining tubular and the second bore-lining tubular.

6. The method of claim 1, wherein at least one of the bore-lining tubulars is one of casing and a liner.

7. The method of claim 1, comprising allowing the alloy to solidify above one of a packer and a liner hanger.

8. The method of claim 1, comprising:
providing the second bore-lining tubular with a second volume of alloy thereon;
locating the first volume of alloy adjacent the second volume of alloy; and
heating the first volume of alloy and allowing the first volume of alloy to heat the second volume of alloy.

9. A downhole apparatus for location in a well bore, the apparatus comprising a volume of fusible alloy, a retainer and a fusible member, the retainer being initially maintained in a retracted position by the fusible member, the fusible member being configured to: (a) retain structural integrity at ambient well temperature, and (b) lose structural integrity when heated above ambient well temperature and permit the retainer to be activated and move to an extended position for maintaining fluidised alloy at a bonding location while the alloy solidifies, the alloy, the retainer and the fusible member being adapted for mounting on a first well bore-lining tubular for location within a second well bore-lining tubular.

10. The apparatus of claim 9, further comprising a first bore-lining tubular for location within a second bore-lining tubular, the first bore-lining tubular having the volume of fusible alloy on an outer portion thereof.

11. The apparatus of claim 10, further comprising a second bore-lining tubular with a second volume of alloy thereon, whereby the first bore-lining tubular is locatable within the second bore-lining tubular with the first volume of alloy adjacent the second volume of alloy.

12. The apparatus of claim 9, wherein the fusible member at least one of: encircles the retainer, and is operatively associated with a retainer restraining arrangement and heating of the fusible member above ambient well temperature permits reconfiguration of the restraining arrangement and allows the retainer to move to the extended position.

13. The apparatus of claim 9, wherein the retainer comprises an arrangement of metal petals.

14. The apparatus of claim 9, wherein the volume of alloy comprises a collar for location on a bore-lining tubular and the apparatus further comprises at least one stop collar for retaining the alloy collar on a tubular.

15. The apparatus of claim 9, wherein the alloy is provided in combination with a volume of flux, and the flux is incorporated with the alloy.

16. The apparatus of claim 9, wherein the alloy is at least one of a tin-based alloy, a high tin alloy comprising at least one of copper, antimony and nickel, and an alloy comprising 2.5-8.5% copper, 4-16% antimony, and less than 1% nickel.

17. The apparatus of claim 9, wherein the volume of alloy extends axially along the first bore-lining tubular and the composition of the alloy varies axially along the tubular.

18. A downhole apparatus comprising a volume of fusible alloy in combination and incorporated with a volume of flux, the alloy adapted for mounting on a first bore-lining tubular for location within a second bore-lining tubular, whereby the flux facilitates downhole bonding between the alloy and the bore-lining tubulars, wherein the flux is provided in cavities within the fusible alloy.

* * * * *